United States Patent [19]

Shioi et al.

[11] Patent Number: 4,490,177
[45] Date of Patent: Dec. 25, 1984

[54] DUAL COLOR INK COMPOSITION

[75] Inventors: Keiko Shioi, Daito; Yukito Shoji, Suita, both of Japan

[73] Assignee: Sakura Color Products Corp., Osaka, Japan

[21] Appl. No.: 544,056

[22] Filed: Oct. 21, 1983

Related U.S. Application Data

[62] Division of Ser. No. 344,933, Feb. 2, 1982.

[51] Int. Cl.$^3$ .............................................. C09D 11/00
[52] U.S. Cl. ...................................... 106/23; 106/22; 106/308 B; 106/308 Q; 106/1.05; 106/1.13; 106/1.14
[58] Field of Search ........... 106/20, 308 Q, 23, 308 B, 106/228 Q, 22, 288 Q, 1.05, 1.13, 1.14; 260/DIG. 38

[56] References Cited

FOREIGN PATENT DOCUMENTS 903724 8/1962 United Kingdom .

*Primary Examiner*—Paul Lieberman
*Assistant Examiner*—Amelia B. Yarbrough

*Attorney, Agent, or Firm*—Wenderoth, Lind & Ponack

[57] ABSTRACT

A method for writing or marking on an absorbent or pervious writing surface to provide a writing or marking composed of an inner portion of a first color with outer contour portions therearound of a second color, which method comprises applying to said surface a writing or marking with an ink comprising:

a first colorant,
a second colorant and
a vehicle,
said first colorant being dispersed in said vehicle and having a particle size sufficiently large so as to substantially not permeate or be absorbed into said writing surface and
said second colorant being dispersed or dissolved in said vehicle, being capable of substantially permeating or being absorbed into said writing surface and diffusing into the area on said surface proximate to said writing,
whereby said second colorant forms said outer contour portions around said inner portion of said first colorant.

16 Claims, No Drawings

DUAL COLOR INK COMPOSITION

This is a Rule 60 Divisional of Ser. No. 344,933, filed Feb. 2, 1982.

The present invention relates to a dual color ink composition, and more particularly, to an ink composition which writes on a pervious or absorbent writing surface to provide marking or writing composed of the inner portions of a color with contour line therearound of another color enclosing the inner portions.

Various color ink compositions, water-base or solvent-base, now in use write marking or writing of a single color based on a pigment used therein. However, on the contrary to such a conventional color ink composition, it is an object of the present invention to provide a dual color ink composition which writes on a pervious or absorbent writing surface to provide marking or writing composed of the inner portions of a first color with the outer contour portions therearound of a second color.

The ink composition according to the invention comprises 20–80% by weight of a solvent, not more than 30% by weight of a binder resin soluble in the solvent and coloring agents dissolved or dispersed in the solvent, the coloring agent comprising:

(a) 3–60% by weight of a first pigment of a first color not less than 0.5 microns in the maximum frequency particle size in particle size distribution, and (b) 0.1–20% by weight of a dyestuff of a second color soluble in the solvent or a second pigment of a second color smaller than the first pigment and not larger than 1 micron in the maximum frequency particle size in particle size distribution.

The first pigment used in the invention has a particle size large enough to be trapped on fibrous network of a pervious or absorbent surface such as paper or cloth when the ink composition is applied thereonto. In other words, the first pigment is such that it does not substantially permeate through the fibrous network of pervious writing surface but remains thereon when the ink composition is applied thereonto and a solvent therein permeates through and diffuses into the fibrous network. The first pigment is therefore preferably at least 0.5 microns in the maximum frequency particle size in particle size distribution, although somewhat depending on chemical and physical properties of the fibrous network, ingredients and viscosity of ink composition, surface properties and density of pigment used therein, etc. More preferably, the first pigment is not less than 2 microns in the maximum frequency particle size so as to be readily trapped on an absorbent writing surface.

A metal powder pigment is most preferably used as the first pigment, and some examples thereof are aluminum powder pigment, bronze powder pigment and copper powder pigment.

So-called metal powder paste commercially available and comprising metal powder dispersed in a solvent is advantageously used in the invention because of its easy handling. A colored metal powder such as colored aluminum powder is also used. An inorganic pigment such as carbon black, cobalt green, cobalt blue, yellow ochre, red iron oxide, viridian, cadmium yellow and ultramarine blue, and an organic pigment such as Hansa Yellow may also be used as the first pigment. The ink composition of the invention includes the first pigment in amounts of 3–60% by weight, preferably 10–40% by weight based on the ink composition.

The ink composition of the invention includes a dyestuff soluble in a solvent used therein and different in color from the first pigment so as to permeate through the fibers network of pervious surface together with the solvent when writing thereon and form the outer portions or contour line of different color which enclose the inner portions of marking. Any dyestuff may be used which has heretofore been used for incorporating into conventional ink compositions. For a water-base ink composition, a dyestuff may be used such as a basic, an acid and a direct dyestuff, and for a solvent-base ink composition, various oil-soluble dyestuff may be used depending upon a solvent used. Here in the invention, a dyestuff soluble in a solvent includes not only a dyestuff completely soluble in the solvent but also a dyestuff finely divided and dispersed in a solvent used so as to permeate through the fibrous network of absorbent writing surface.

According to the invention, a second pigment may be used in place of or together with the dyestuff as the second coloring agent to form the contour line of marking or writing. The second pigment must be small enough to permeate through and diffuse into an absorbent writing surface together with a solvent used, like the dyestuff, when writing, and therefore the second pigment is smaller than the first pigment used, and preferably not larger than 1 micron in the maximum frequency particle size.

It is not desirable to use a pigment larger than 1 micron in the maximum frequency particle size as the second pigment since such a pigment tends to be trapped and fixed on a permeable writing surface. As the second pigment may be used, for example, carbon black, Phthalocyanine Blue and various lake. The ink composition of the invention includes the dyestuff and/or the second pigment in amounts of 0.1–20% by weight, preferably 0.5–15% by weight based on the ink composition.

It should be understood, however, that the first and the second pigment are relatively distinguished from each other in particle size and color only, hence a pigment may be used as the first pigment in some cases, and as the second pigment in other cases depending upon the particle size of a second pigment used.

Any solvent may be used as a vehicle of the ink composition of the invention depending upon water-base or solvent-base. In a water-base composition, water or a mixture of water and a water-soluble organic solvent is used. As a water-soluble organic solvent may be used, for example, as $C_1$–$C_8$ monohydric and polyhydric alcohol such as ethanol, propanol, glycerine, ethylenglycol, propyleneglycol, diethyleneglycol, dipropyleneglycol and ethyleneglycolmonoalkylether, and a $C_3$–$C_{10}$ aliphatic and alicyclic ketone such as methyl ethyl ketone and cyclohexanone. In particular, the incorporation of lower aliphatic alcohol such as ethanol, propanol, ethyleneglycolmonoethylether and/or a ketone such as methyl ethyl ketone is preferred to enhance the permeability of the ink composition into absorbent fibers network when writing. On the other hand, the polyhydric alcohol such as glycerine and ethyleneglycol serve to depress the evaporation and loss of volatile components in the ink composition. The water-base ink composition may further contain urea or thiourea therein to achieve more smooth writing therewith since urea or thiourea depresses very effectively the evaporation of water and other volatile components in cooperation with the polyhydric alcohol. The water ink composition preferably further contains effective amounts of surfactant so that pigments are uniformly dispersed therein as well as the ink composition has a higher permeability into the fibers network when writing. Any surfactant is used, for example, a polyoxyethylenealkylether, a sorbitan fatty acid ester and an alkylamine.

In a solvent-base ink composition, an organic solvent may be used, for example, a $C_6$-$C_{10}$ alicyclic hydrocarbon such as cyclohexane, methylcyclohexane, ethylcyclohexane and dimethylcyclohexane, a $C_5$-$C_{12}$ aliphatic hydrocarbon such as n-hexane and n-octane, a $C_6$-$C_{10}$ aromatic hydrocarbon such as benzene, toluene and xylene, a $C_3$-$C_{10}$ aliphatic and alicyclic ketone such as methyl ethyl ketone, methyl isobutyl ketone and cyclohexanone, a $C_3$-$C_{10}$ aliphatic carboxylic acid alkyl ester such as ethyl acetate, butyl acetate, butyl propionate and amyl acetate, and a $C_1$-$C_6$ aliphatic alcohol such as ethanol, propanol, butanol, ethyleneglycolmonoethyland monobutyl ether, and a mixture of two or more of these.

The ink composition of the invention, water-base or solvent-base, contains the solvent as aforesaid in amounts of 20-80% by weight, preferably 35-70% by weight based on the ink composition. The specified amounts of coloring agents and solvent impart a proper viscosity for writing to the ink composition.

The ink composition of the invention preferably contains a resin in amounts not more than 30% by weight based on the ink composition, preferably 1-20% by weight, so as to have a proper adhesiveness onto writing surface when writing as well as a proper viscosity. Any resin may be used as a binder depending upon the solvent used. A water-soluble resin is used in a water-base ink composition, and sodium carboxymethylcellulose, polyvinyl alcohol and polyvinyl pyrrolidone, for example, are preferably used in the invention. In a solvent-base ink composition, on the other hand, a resin soluble in the solvent used is incorporated into the ink composition. For example, a natural resin such as rosin, a rosin modified resin such as rosin ester, rosin modified maleic acid resin and rosin modified phenol resin, other phenol resins, a petroleum resin, a ketone resin, an alkyd resin, a xylene resin, an indene-coumarone resin, a cellulose resin such as ethylcellulose and acetylcellulose, polyvinyl butyral resin, a vinyl chloridevinyl acetate copolymer, a vinylidene chloride-acrylonitrile copolymer, a vinylidene chloride-vinyl chloride copolymer and a mixture of two or more of these.

When necessary, the ink composition of the invention may further contain an effective amount of additional additives such as an antiseptic, e.g., sodium benzoate and potassium sorbate, and a plasticizer, e.g., dioctyl phthalate and tricresyl phosphate. A rust-preventive agent may also be contained in the ink composition, if necessary, in particular in the composition which contains a metal powder pigment as the first pigment therein.

When marking or writing is formed on an absorbent or pervious surface such as paper or cloth with the ink composition of the invention, the first pigment comprising coarse particles is trapped and fixed on the pervious surface along the marking to form the inner portions of marking. The dyestuff and/or the second pigment comprising fine particles also in part form the inner portions of marking together with the first pigment, but in part permeate through the writing surface together with the solvent to reach the outside of the margin of the marking or writing, thereby to form the outer portions or contour line of the marking so as to enclose the inner portions therein. That is, dual color marking is formed which comprises the inner portions of one color with the contour line therearound of the other color.

The inner portions of marking or writing are formed by the first pigment and occasionally in part by the dyestuff and/or the second pigment, hence a single or mixed color based thereon, whereas the outer portions are formed by the dyestuff and/or the second pigment, as described above. Therefore, when a pigment is used for forming the outer contour of marking, the larger the difference in the particle size between the first and second pigment used or the larger the hiding and tinting power of the first pigment, then the more clearly colored by the first pigment the inner portions of marking. However, when the difference in the particle size between the first and the second is small or when the first pigment has small hiding and tinting power while the second pigment has large hiding and tinting power, then the inner portions of marking may have a mixed color of the two pigments. The width of contour line may be varied by controlling the permeability of solvent used, and choosing the particle size of the second pigment when it is used for forming the contour of marking.

The ink composition of the invention is applied onto a pervious writing surface preferably with a so-called marking pen which is provided with a writing felt-tip to provide marking about 1-50 mm in width, however, the ink composition is not restricted to any writing tool for writing.

The ink composition of the invention may be prepared by any known method in the art. For example, a binder resin, and when necessary, a surfactant, an antiseptic and a plasticizer, are added to a solvent and stirred, and then to a resultant solution is added the dyestuff and/or the second pigment, and stirred for a sufficient period of time under heating if necessary. Then the first pigment is added to the resultant dispersion and stirred for a period of time sufficient to provide a uniform ink composition. All the ingredients may be added to a solvent at the same time if desired. Any dispersing means such as a ball mill may be used in the preparation of the ink composition if necessary.

The present invention will be more clearly understood with reference to the following examples, which however are intended to illustrate the invention only and are not to be construed to limit the scope of the invention, and in the examples, unless otherwise stated, quantities are expressed as parts by weight and particle size of pigment used means the maximum frequency particle size.

EXAMPLE 1

The following ingredients were mixed and stirred for 1 hour at room temperature:
- 2 parts of C.I.Acid Red 92 (Hodogaya Chemical Co., Ltd., Aizen Acid Phloxine PB)
- 2 parts of sodium carboxymethylcellulose (Daiichi Kogyo Seiyaku Co., Ltd., Cellogen 6A)
- 20 parts of ethyleneglycol
- 2 parts of ethyleneglycolmonobutylether
- 0.2 parts of surfactant polyoxyethyleneoleylether, Daiichi Kogyo Seiyaku Co., Ltd., Noigen P)
- 1 part of sodium benzoate
- 0.2 parts of rust-preventive agent (Kao-Atlas Co., Ltd., Corromin CB)
- 43.8 parts of water To the resultant mixture was added 30 parts of bronze powder pigment (Toyo Aluminum Co., Ltd., BS 947) and stirred for another 1 hour at room temperature to provide an ink composition, which, when applied to paper, forms a marking composed of the inner golden portions with the outer red contour line therearound enclosing therein the inner portions.

EXAMPLE 2

The following ink composition was formulated in the same manner as in EXAMPLE 1:
- 1 part of Cyanine Blue (Dainichi Seika Color & Chemicals Mfg. Co., Ltd., #4920)
- 6 parts of glycerine
- 15 parts of ethyleneglycol
- 0.2 parts of surfactant (Kao-Atlas Co., Ltd, Scourol #400)
- 1 part of sodium benzoate
- 0.2 parts of rust-preventive agent (Tatsuta Electric Wire Co., Ltd., Pal C)
- 15 parts of water dispersion aluminum powder paste (Toyo Aluminum Co., Ltd., Alpaste 1500MA, solid content 70%)
- 61.6 parts of water The ink composition forms a marking composed of the inner silver portions with the outer blue contour therearound.

EXAMPLE 3

An ink composition was formulated in the same manner as in EXAMPLE 2 except the use of 5 parts of glycerine and an additional use of 1 part of polyvinyl alcohol (Kuraray Co., Ltd., Poval 420). The water-base ink composition on paper provides a marking the same as that of EXAMPLE 2.

EXAMPLE 4

The following ink composition was formulated in the same manner as in EXAMPLE 1:
- 30 parts of C.I.Solvent Red 49 (Orient Chemical Co., Ltd., Oil Pink #312)
- 1 part of C.I.Solvent Blue 25 (BASF, Neozapon Blue FLE) 10 parts of alkyd resin (Japan Reichhold Chemicals, Inc., Styresol J-718, resin content about 50%, solvent mineral turpentine)
- 4 parts of xylene resin (Mitsubishi Gas Kagaku K.K., Nikanol HP 100)
- 3 parts of indene-coumarone resin (Nittetsu Chemical Industrial Co., Ltd., Nittetsu Coumarone V-120)
- 10 parts of aluminum powder paste (Toyo Aluminum Co., Ltd., Alpaste 0230T, non-volatile content 80.7%)
- 30 parts of n-butyl acetate
- 53.5 parts of xylene The solvent-base ink composition, when applied to paper, provides a marking composed of the inner silver portions with the outer violet contour line therearound.

EXAMPLE 5

The following solvent-base ink composition was formulated in the same manner as in EXAMPLE 1:
- 5 parts of amine salt of C.I.Basic Red 1 (Hodogaya Chemical Co., Ltd., Spilon Red CGH)
- 10 parts of phenol resin (Hitachi Kasei Kogyo K.K., Hitanol 1133)
- 5 parts of xylene resin (loc. cit.)
- 15 parts of bronze powder pigment (loc. cit.)
- 4 parts of amyl acetate
- 73 parts of n-butyl acetate The ink composition on paper forms a marking composed of the inner golden portions with the outer red contour.

EXAMPLE 6

The following solvent-base ink composition was formulated in the same manner as in EXAMPLE 1:
- 18 parts of fluorescent pigment (Sinloihi Co., Ltd., Sinloihi Color EXL 1539F)
- 5 parts of acrylic resin (Rohm and Haas, Japan K.K., Acryloid B66)
- 10 parts of aluminum powder paste (Alpaste 0230T, loc. cit.)
- 43 parts of isobutyl acetate
- 4 parts of isopropanol
- 20 parts of toluene The ink composition on paper provides a marking composed of the inner silver portions with the outer pink contour line therearound.

EXAMPLE 7

The following mixture was permitted to stand overnight in a closed vessel at room temperature to swell the resin on the pigment in the solvent, and then was stirred for 2 hours at room temperature:
- 7 parts of resinated pigment (0.2 microns, CIBA, Microlith Brown 2RK)
- 15 parts of bronze powder pigment (Fukuda Metals K.K., #7770)
- 78 parts of n-butyl acetate The ink composition on paper forms a marking composed of the inner golden portions with the outer brown contour line therearound.

EXAMPLE 8

The following ink composition was formulated in the same manner as in EXAMPLE 1:
- 5 parts of C.I.Solvent Red 18 (Orient Chemical Co., Ltd., Oil Scarlet #308S)
- 10 parts of resinated titanium oxide pigment (Dainichi Seika Color & Chemicals Mfg. Co., Ltd., PAGC 7807 White)
- 9 parts of petroleum resin (Nippon Sekiyu Kagaku Kogyo K.K., Neopolymer 140)
- 0.8 parts of nonionic surfactant (Neos K.K., Neosulmin S/M 10 parts of aluminum powder paste (Alpaste 0230T, loc. cit.)
- 65.2 parts of xylene The ink composition on paper provides a marking composed of the inner silver portions with the outer red contour line therearound.

EXAMPLE 9

The following solvent-base ink composition was formulated in the same manner as in EXAMPLE 1:
- 5 parts of amine salt of C.I.Basic Red 1 (loc. cit.)
- 10 parts of phenol resin (loc. cit.)
- 5 parts of xylene resin (loc. cit.)
- 10 parts of bronze powder pigment (BS 947, loc. cit.)
- 5 parts of aluminum powder paste (Alpaste 0230T, loc. cit.)
- 4 parts of amyl acetate
- 73 parts of n-butyl acetate The ink composition forms a writing composed of the inner golden white portions with the outer red contour portions therearound.

EXAMPLE 10

The following ink composition was prepared in the same manner as in EXAMPLE 1:
2 parts of C.I.Acid Red 92 (loc. cit.)
2 parts of sodium carboxymethylcellulose (loc. cit.)
20 parts of ethyleneglycol
2 parts of ethyleneglycolmonobutylether
0.2 parts of surfactant polyoxyethyleneoleylether (Noigen P, loc. cit.)
1 part of sodium benzoate
6 parts of carbon block (8 microns)
60 parts of water The ink composition forms on a pervious surface a marking composed of the inner black portions with the outer red contour line therearound.

EXAMPLE 11

Ten parts of ammonium salt of a copolymer consisting of ethyl methacrylate-butyl methacrylate-hydroxyethyl methacrylate-methacrylic acid (mole ratio 25/40/20/15), 20 parts of ethyleneglycol, 5 parts of dipropyleneglycol, 15 parts of quinacridone red pigment, 20 parts of thiourea and 40 parts of water were stirred with a paint shaker for 2 hours at room temperature, and to the resultant mixture were further added 20 parts of ethyleneglycol and 40 parts of water followed by stirring for another 10 minutes. Coarse pigment particles were filtered off to provide an aqueous dispersion containing 8.8% by weight of pigment (0.08 microns).

Then the following ink composition was formulated in the same manner as in EXAMPLE 1:
10 parts of above pigment dispersion
5 parts of glycerine
15 parts of ethyleneglycol
0.2 parts of surfactant polyoxyethyleneoleylether (Scourol #400, loc. cit.)
1 part of sodium benzoate
5 parts of ultramarine blue (40 microns, Daiichi Kasei Kogyo K.K.)
61.6 parts of water The ink composition on paper provides marking composed of the inner blue portions with the outer red contour line therearound.

EXAMPLE 12

The following solvent-base ink composition was prepared in the same manner as in EXAMPLE 1:
6 parts of C.I.Solvent Red 49 (loc. cit.)
1 part of C.I.Solvent Blue 25 (loc. cit.)
10 parts of alkyd resin (loc. cit.)
4 parts of xylene resin (loc. cit.)
2 parts of indene-coumarone resin (loc. cit.)
6 parts of carbon black (8 microns)
30 parts of n-butyl acetate
53.5 parts of xylene The ink composition provides a marking composed of the inner black portions with the outer violet contour therearound.

EXAMPLE 13

The following ink composition was formulated in the same manner as in EXAMPLE 1. The ink composition on paper forms a marking composed of the inner yellow portions with the outer red contour line therearound.
5 parts of amine salt of C.I.Basic Red 1 (loc. cit.)
10 parts of phenol resin (loc. cit.)
5 parts of xylene resin (loc. cit.)
7 parts of cadmium yellow (20 microns, Toyo Ganryo Ind. Co., Ltd.)
4 parts of amyl acetate
73 parts of n-butyl acetate

EXAMPLE 14

The following ink composition formulated in the same manner as in EXAMPLE 1 on paper provides a marking composed of the inner blue portions with the outer pink contour line therearound.
18 parts of fluorescent pigment (loc. cit.)
5 parts of acrylic resin (loc. cit.)
6 parts of cobalt blue (45 microns, Toyo Ganryo Ind. Co., Ltd.)
43 parts of isobutyl acetate
4 parts of isopropanol
20 parts of toluene

EXAMPLE 15

The following ink composition was formulated in the same manner as in EXAMPLE 1:
4 parts of pigment (0.09 microns, Dainichi Seika Color & Chemicals Mfg. Co., Ltd., PAGC 7221 Red)
9 parts of petroleum resin (loc. cit.)
0.8 parts of surfactant (Neosulmin, loc. cit.)
5 parts of viridian (30 microns, Toyo Ganryo Ind. Co., Ltd., Viridian 3B)
65.2 parts of xylene The solvent-base ink composition on paper provides a marking composed of the inner brown portions with the outer rosy contour line therearound.

EXAMPLE 16

The following ink composition was formulated in the same manner as in EXAMPLE 1:
3 parts of pigment (0.1 microns, Dainichi Seika Color & Chemicals Mfg. Co., Ltd., PAGC 7122 Yellow)
10 parts of phenol resin (loc. cit.)
5 parts of xylene resin (loc. cit.)
6 parts of burnt umber (35 microns, Mie Ganryo K.K.)
4 parts of amyl acetate
73 parts of n-butyl acetate The solvent-base ink composition on paper provides a marking composed of the inner dark brown portions with the outer yellow contour line therearound.

EXAMPLE 17

The following mixture was stood overnight in a closed vessel at room temperature to swell the resin on the pigment:
7 parts of resinated pigment (Microlith Brown 2RK, loc. cit.)
5 parts of carbon black (8 microns)
78 parts of n-butyl acetate The mixture was then stirred for 2 hours at room temperature to provide a solvent-base ink composition. The ink composition on paper provides a marking composed of the inner black portions with the outer brown contour line therearound which encloses the inner portions.

What is claimed is:

1. A method for writing on an absorbent or pervious writing surface to provide a writing composed of an inner portion of a first color with substantial outer contour portions therearound of a second color, which method comprises applying to said surface a writing with an ink comprising:
a first colorant,
a second colorant,
a vehicle,
said first colorant also being dispersed throughout said vehicle and having a particle size sufficiently large so as to substantially not permeate or be absorbed into said writing surface and
said second colorant being dispersed or dissolved in said vehicle, being capable of substantially permeating or being absorbed into said writing surface and diffusing into the area on said surface proximate to said writing
whereby said second colorant forms said outer contour portions around said inner portion of said first colorant.

2. The method as claimed in claim 1 wherein the first colorant is at least one member selected from the group consisting of a metal powder pigment, an inorganic pigment and an organic pigment.

3. The method as claimed in claim 1 wherein the vehicle is a mixture of water and at least one water-soluble organic solvent.

4. The method as claimed in claim 1 wherein the vehicle is a solvent including at least one member selected from the group consisting of an alicyclic hydrocarbon, an aliphatic hydrocarbon, an aromatic hydrocarbon, an aliphatic ketone, an alicyclic ketone, an aliphatic carboxylic acid alkyl ester, an aliphatic alcohol, and an ethyleneglycolmonoalkylether.

5. The method in claim 1 wherein the ink composition comprises:
35–70% by weight of the vehicle,
1–20% by weight of resin,
10–40% by weight of the first colorant, and
0.5–15% by weight of the second colorant.

6. The method as claimed in claim 1 wherein the ink composition further comprises effective amounts of at least one additive selected from the group consisting of a surfactant, an antiseptic and a rust-preventive agent.

7. The method as claimed in claim 1 wherein the first colorant is a pigment of not less than 2 microns in the maximum frequency particle size in particle size distribution.

8. The method as claimed in claim 1 wherein the second colorant is a metal powder pigment.

9. The method according to claim 1 wherein the ink composition comprises 20–80% by weight of the vehicle, not more than 30% by weight of a resin soluble in the vehicle, and said first and second colorants dissolved or dispersed throughout the vehicle, the colorants comprising:
(a) 3–60% by weight of the first colorant, said first colorant being a pigment of not less than 0.5 microns in the maximum frequency particle size, and
(b) 0.1–20% by weight of the second colorant, said second colorant being a dyestuff soluble in the vehicle or a pigment smaller in particle size than the first pigment and not more than 1 micron in the maximum frequency particle size in particle size distribution.

10. The method as claimed in claim 9 wherein the first pigment is at least one member selected from the group consisting of a metal powder pigment, an inorganic pigment and an organic pigment.

11. The method as claimed in claim 9 wherein the vehicle is a mixture of water and at least one water-soluble organic solvent.

12. The method as claimed in claim 9 wherein the vehicle is at least one member selected from the group consisting of an alicyclic hydrocarbon, an aliphatic hydrocarbon, an aromatic hydrocarbon, an aliphatic ketone, an alicyclic ketone, an aliphatic carboxylic acid alkyl ester, an aliphatic alcohol, and an ethyleneglycolmonoalkylether.

13. The method as claimed in claim 9 wherein the ink composition comprises:
35–70% by weight of the vehicle,
1–20% by weight of the resin,
10–40% by weight of the first colorant, and
0.5–15% by weight of the second colorant.

14. The method as claimed in claim 9 wherein the ink composition further comprises effective amounts of at least one additive selected from the group consisting of a surfactant, an antiseptic and a rust-preventive agent.

15. The method as claimed in claim 9 wherein the first pigment is not less than 2 microns in the maximum frequency particle size in particle size distribution.

16. The method as claimed in claim 9 wherein the second colorant is a metal powder pigment.

* * * * *